United States Patent
Schroeder

(10) Patent No.: US 9,641,349 B2
(45) Date of Patent: May 2, 2017

(54) SYSTEMS AND METHODS OF VIRAL ENABLEMENT OF FEATURES BY PEER-TO-PEER CONNECTION

(71) Applicant: salesforce.com, inc, San Francisco, CA (US)

(72) Inventor: Jason Schroeder, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 214 days.

(21) Appl. No.: 14/257,840

(22) Filed: Apr. 21, 2014

(65) Prior Publication Data

US 2014/0317191 A1    Oct. 23, 2014

Related U.S. Application Data

(60) Provisional application No. 61/814,468, filed on Apr. 22, 2013.

(51) Int. Cl.
*G06F 15/173* (2006.01)
*H04L 12/18* (2006.01)

(52) U.S. Cl.
CPC ...... *H04L 12/1813* (2013.01); *H04L 12/1818* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

OTHER PUBLICATIONS

T. Bläsing ; L. Batyuk ; A. D. Schmidt ; S. A. Camtepe ; S. Albayrak "An Android Application Sandbox system for suspicious software detection" 2010 5th International Conference on Malicious and Unwanted Software, 2010 IEEE.*

*Primary Examiner* — Scott B Christensen
(74) *Attorney, Agent, or Firm* — Haynes Beffel & Wolfeld

(57) ABSTRACT

The technology disclosed relates to identifying and notifying a user of nearby attendees at a mega attendance event who are in user's social graph by comparing the user's social graph to a list of event attendees. The identified attendees can be stratified into social graph tags that annotate, categorize and prioritize other users in the user's social graph. The technology disclosed also relates to identifying and notifying the user of nearby attendees of sessions at the event who meet introduction preferences of the user by finding matches between introduction preference attributes specified by the user and attributes of the attendees provided by the list of event attendees.

25 Claims, 7 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,917,951 B1* | 3/2011 | Tarbotton ............ G06Q 10/107 713/188 |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,375,450 B1* | 2/2013 | Oliver .................... G06F 21/56 713/181 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,583,915 B1* | 11/2013 | Huang ................ H04L 63/0869 713/155 |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0117593 A1* | 5/2007 | Izdepski ................ H04L 63/14 455/565 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0084807 A1* | 4/2011 | Logan ...................... H04Q 9/00 340/10.1 |
| 2011/0209218 A1* | 8/2011 | McRae .................... G06F 21/53 726/23 |
| 2012/0030731 A1* | 2/2012 | Bhargava ................ G06F 21/54 726/3 |
| 2012/0099219 A1* | 4/2012 | Al-Azzawi ............. G06F 21/56 360/62 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |

(56) References Cited

U.S. PATENT DOCUMENTS

| | | | |
|---|---|---|---|
| 2013/0254304 A1* | 9/2013 | Van Nest | H04L 67/04 709/206 |
| 2013/0297680 A1* | 11/2013 | Smith | H04L 29/08117 709/203 |
| 2013/0298243 A1* | 11/2013 | Kumar | G06F 21/52 726/25 |
| 2014/0075536 A1* | 3/2014 | Davis | H04L 63/1416 726/13 |
| 2014/0215617 A1* | 7/2014 | Smith | H04L 63/1441 726/23 |

* cited by examiner

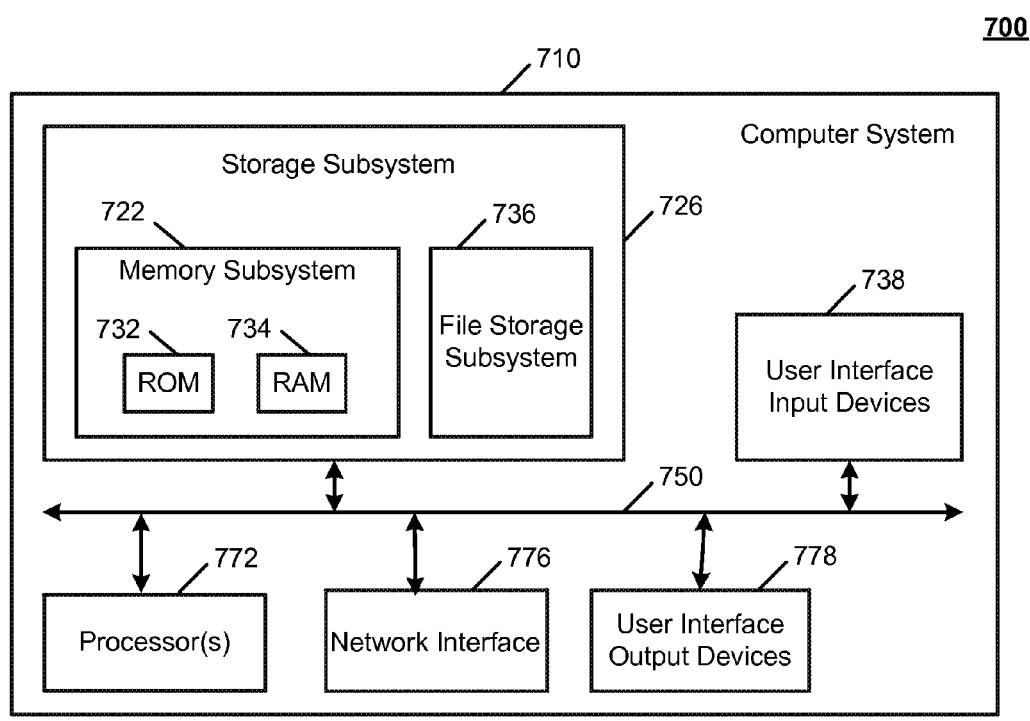
FIG. 7 – Computer System

SYSTEMS AND METHODS OF VIRAL ENABLEMENT OF FEATURES BY PEER-TO-PEER CONNECTION

RELATED APPLICATION

The application claims the benefit of U.S. provisional Patent Application No. 61/814,468, entitled, "Peer-to-Peer Enablement," filed on Apr. 22, 2013. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to enablement of new features embedded in downloaded software. In particular, it relates to passing enablement of a new feature from one user to the next by personal, proximate contact, in contrast to centralized or distantly email conveyed enablement of hidden features already present in an application.

Software can be downloaded that requires an unlock code to enable features or to extend operation of the software beyond a trial period. It can be convenient for a software vendor to distribute code that contains a complete feature set and enable only selected features for which the customer has paid. Unlocking features is controlled by a central licensing server. A unique code or a hash of a code plus the user identifier (ID) is provided by the licensing server and used by the installed code to unlock already installed features. This is often called a license key. It may be short enough to be typed by a user or it may be so long that it needs to be cut and pasted or loaded as a file.

Unlocking features has been depersonalized because automation scales. The less personal, the more efficient.

An opportunity arises to reverse the whole approach, to personalize feature activation. Improved user experience and engagement and higher user satisfaction and retention may result.

SUMMARY

The technology disclosed relates to enablement of new features embedded in downloaded software. In particular, it relates to passing enablement of a new feature from one user to the next by personal, proximate contact, in contrast to centralized or distantly email conveyed enablement of hidden features already present in an application.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 7 is a block diagram of an example computer system 700 used by an infectious or susceptible device.

DETAILED DESCRIPTION

Figure 1:
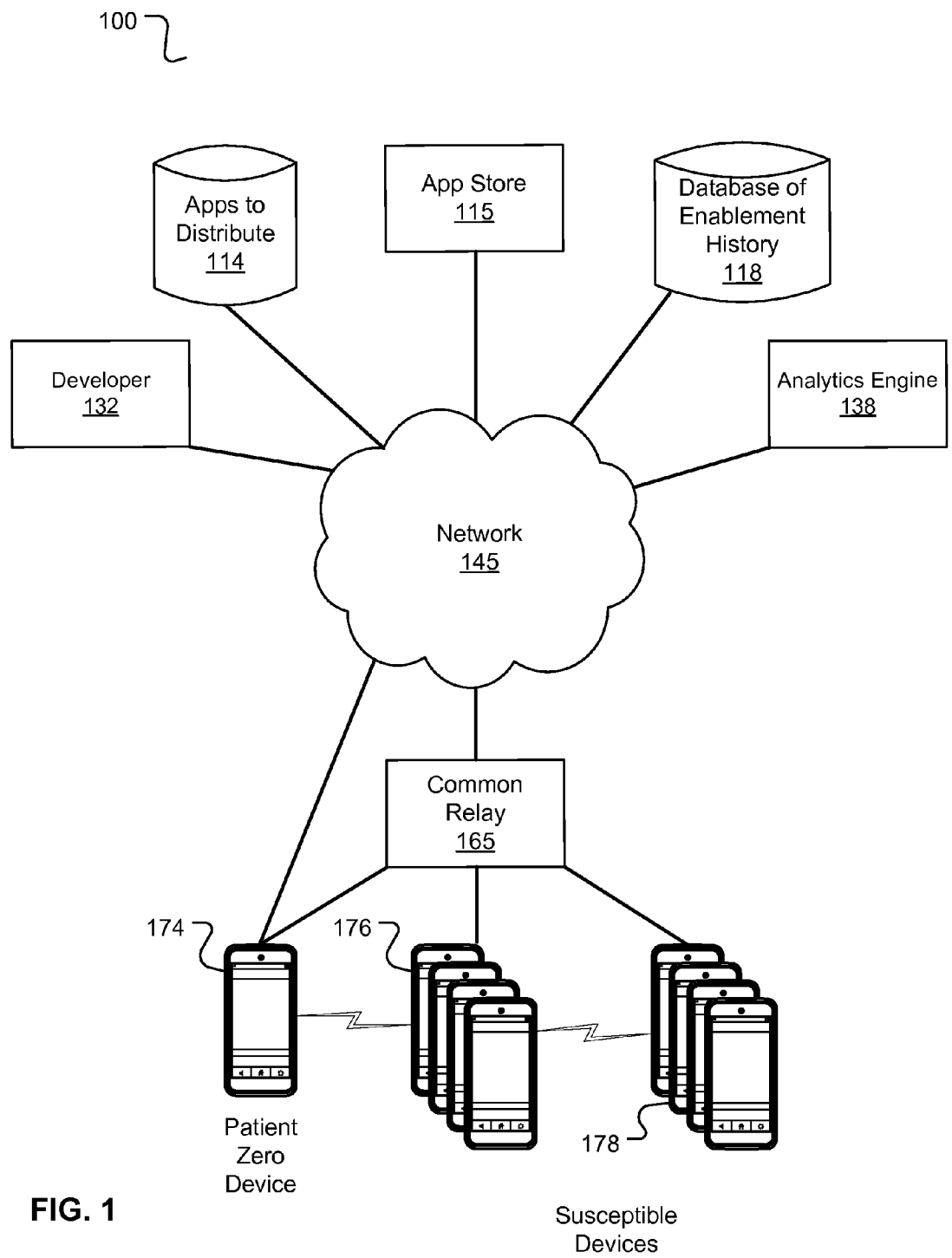
FIG. 1 shows example systems and actors that interact to spread enablement of a feature by proximate interaction.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Examples of systems, apparatus, and methods according to the disclosed implementations are described in a "conference" context. The examples of conferences and meetings are being provided solely to add context and aid in the understanding of the disclosed implementations. In other instances, examples of occasions for enablement by proximate interaction may include retail store launches, retail promotions, sporting events, concerts, and other events attended by many types of mobile device users. Other applications are possible, such that the following examples should not be taken as definitive or limiting either in scope, context or setting. It will thus be apparent to one skilled in the art that implementations may be practiced in or outside the conference context.

The technology disclosed relates to using proximate contact to enable features that are disabled or hidden but already present on a mobile device, spreading through a user population like a virus, from user to user. This technology is described borrowing terms from epidemiology, such as "patient-zero device", "infectious device", and "susceptible device". The technology disclosed can be implemented with any population or mixture of computer-implemented mobile system including smart phones, tablets, laptops, computing glasses, personal assistants, wearable computers, and the like. In a home or business, a mobile device could carry enablement to a stationary device at home or the office.

Initial distribution of applications with disabled or hidden features relies on a computer-implemented system, such as an app store, a database system, a multi-tenant environment, or the like. Moreover, this technology can be implemented using two or more separate and distinct computer-implemented systems that cooperate and communicate with one another. This technology may be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

At a conference, the technology disclosed spreads enablement of a pre-installed feature from one or more patient-zero devices that are infectious to susceptible devices. A susceptible device is infected by a feature enablement token. The susceptible device user and the infectious device user can each be given control over conveyance of feature enablement tokens. A feature enablement token is processed to enable at least one disabled or hidden feature and to infect the susceptible device, making it infectious to further susceptible devices. In some implementations, multiple features can be enabled for a convention goer as they attend sessions correlated with or rewarded by various features. The mobile devices can report enablement metadata to an analytics server. The details of enablement metadata can be user controlled. Enablement spreads through convention goers like a made for TV virus. The analytics server allows convention goers to follow the spread of multiple features through the convention population in real time (more closely than the best CDC technology) in more or less detail as dictated by privacy concerns. In some implementations, spread can be geographically mapped at the convention site and beyond.

At a convention, the patient-zero device can be a mobile device, a stationary device, or a mobile device stationed at a particular location in a conference room. The speaker in a meeting room could hold the patient-zero device and allow everyone within Bluetooth LE range, for instance, to enable feature one on their first mobile device. The infected first mobile devices, with or without user control, could enable feature one on second mobile devices nearby, until proximate interactions in the meeting room enabled the feature for everyone who wanted the feature enabled or everyone whose device had the feature preloaded and auto enablement active. In some deployments, patient-zero infectious devices could be positioned at entrances and exits to the room or at a prominent kiosk.

Spread of enablement could begin at a predetermined time set in patient zero devices, susceptible devices, or both. Other criteria could control the outbreak of feature enablement. For instance, special bonus feature enablement could be available to a limited number of lucky convention goers. Following this example, the conference room could be geo-fenced so that the spread of enablement codes was more or less infectious, more or less user controlled outside the conference room than inside the room.

In an alternative embodiment, the technology disclosed spreads download enablement tokens used to install a new feature. A live network at the convention combined with content delivery network edge caching could make installation nearly immediate. A less pervasive delivery system might slow spread of enablement tokens until after installation of the new feature. In some implementations, a device that has received an enablement token could be infectious before the feature is symptomatic, before it is downloaded, enabled, or active.

Systems and Actors

FIG. 1 shows example systems and actors 100 that interact to spread enablement of a feature by proximate interaction. FIG. 1 includes a developer 132, app store 115, analytics engine 138, apps to distribute 114, and a database of enablement history 118. These components are linked in communication by a network 145. FIG. 1 also includes first and second susceptible devices 176 and 178, and one or more patient-zero infectious devices 174. Devices 174, 176, and 178 can communicate through a common relay 165 such as an access point or directly, without relay, as illustrated by lightning comm link connections. These devices can communicate with a broader network 145 by direct connection, such as a cellular or WiMax connection or through one or more relays 165.

FIG. 1 shows an environment 108 that includes various actors along with their devices and networks that interconnect the devices. In other implementations, systems and actors 100 may not have the same systems and/or actors as those listed above and/or may have other/different systems and actors instead of, or in addition to, those listed above. The different systems can be combined into single software modules and multiple software modules can run on the same hardware.

In this environment, some components are linked in communication by a network 145. Communications network(s) 145 can be any network or combination of networks of devices that communicate with one another. For instance, network 145 can be any one or any combination of Local Area Network (LAN), Wide Area Network (WAN), the Internet, or private networks. Devices can connect to the network via cellular communications, WiMax, WiFi, telephone network, wireless network, mesh network, or wired network. The network can be arranged as a point-to-point network, star network, token ring network, or hub network. Devices can be connected by peer-to-peer connections like Bluetooth, Bluetooth LE, low power WiFi, Near Field Communication (NFC), Z-Wave, ZigBee, or other appropriate configuration.

The developer 132 prepares and deploys client-side code for mobile devices with hidden or disabled features. The client-side code also can accept downloadable feature modules that can be downloaded at the same time or separately from a main module. Mobile devices typically are tied to an app store 115. Some mobile devices accept apps exclusively from a designated app store 115, at least unless hacked, hijacked, or otherwise modified. Other mobile devices prefer an app store 115 but also accept apps from other sources. In some implementations, the app store can be implemented using varying types of computers such as a workstation, server, computing cluster, blade server, server farm, or any other data processing system or computing device. The engine can be communicably coupled to the databases via a different network connection.

Apps to distribute 114 can be stored by or on behalf of the app store 115, developer 132, or both. The data stores and databases used with the technology described use tangible memory that can be organized as relational database management systems (RDBMSs), object oriented database management systems (OODBMSs), distributed file systems (DFS), no-schema databases, file structures, or any other data storing systems. Tangible memory used for storing data can be rotating or nonrotating. Examples of rotating memory are hard disk drives and optical drives. Examples of nonrotating memory are SRAM, NRAM, DRAM, flash memory, and SSD drives. In this application, tangible memory is not meant to include transitory signals subject to the Federal Circuit rule of In re Nuijten.

The environment illustrated includes an analytics engine 138. This analytics engine 138 may include a monitoring component that receives messages reporting feature enablement or infection. In some implementations, a separate monitoring server that does not appear in the figure may be part of the system. The analytics engine 138 can be implemented using varying types of computers such as a workstation, server, computing cluster, blade server, server farm, or any other data processing system or computing device Analytics engine 138 receives reporting messages. These reporting messages may include metadata such as the location of the device receiving enablement, the location of the device providing enablement, unique identification of either the devices, a date and time stamp for the enablement (which may be different from the date and time that the corresponding reporting messages received), or other descriptive information. The analytics engine 138 summarizes and provides displays of this information. In simple case, the summary is a count of devices receiving enablement. The count could be updated in real-time or periodically. In more elaborate case, geo-tagging information is received and the geographic spread of enablement is depicted on a map or graph. The forms of graph or visual display used in epidemiology can be applied by the analytics engine 138.

Using analytics and logs, a transmission graph may be generated that details how the feature was passed from person to person. Similar to a viral transmission graph, the feature enablement percentage of the general user population may grow from 0% towards 100%. Using the transmission graph, conclusions may be drawn near spikes in the transmission rate. For example, the graph may show spikes in transmission rate that correlate to lunch periods, dinner events, and evening parties where there is a broad pollination of users. Other types of visual presentations of transmission data may be generated to show the progress of feature enablement through peer-to-peer transactions.

A data visualization of successful transactions may be generated based on a log of the indications received from the plurality of user devices. The data visualization may be presented as a transmission graph over time, in one embodiment. In another embodiment, events may be combined into the transmission graph such that the events are displayed as an overlay over the transmission graph.

Data used by the analytics engine 138 can be stored in a database of enablement history 118. As with the store of apps to distribute, many types of alternative tangible memory can be used to store this data. In this application, tangible memory is not meant to include transitory signals subject to the Federal Circuit rule of In re Nuijten.

FIG. 1 also includes first and second susceptible devices 176 and 178, and one or more patient-zero infectious devices 174. The susceptible devices or mobile devices of any of the types described above. Client-side code running on susceptible devices receives enablement tokens or other infectious messages as further described elsewhere. Susceptible client-side code is transformed into infectious client-side code. One or more patient-zero infectious devices 174 start out as infectious to susceptible devices.

In addition to devices 174, 176, and 178 communicating directly, without relay, or through a common relay 165 these devices can communicate with a broader network 145 by direct connection, such as a cellular or WiMax connection or through one or more relays 165.

Proximate interaction between devices is further described in the context of other figures.

Figure 2:
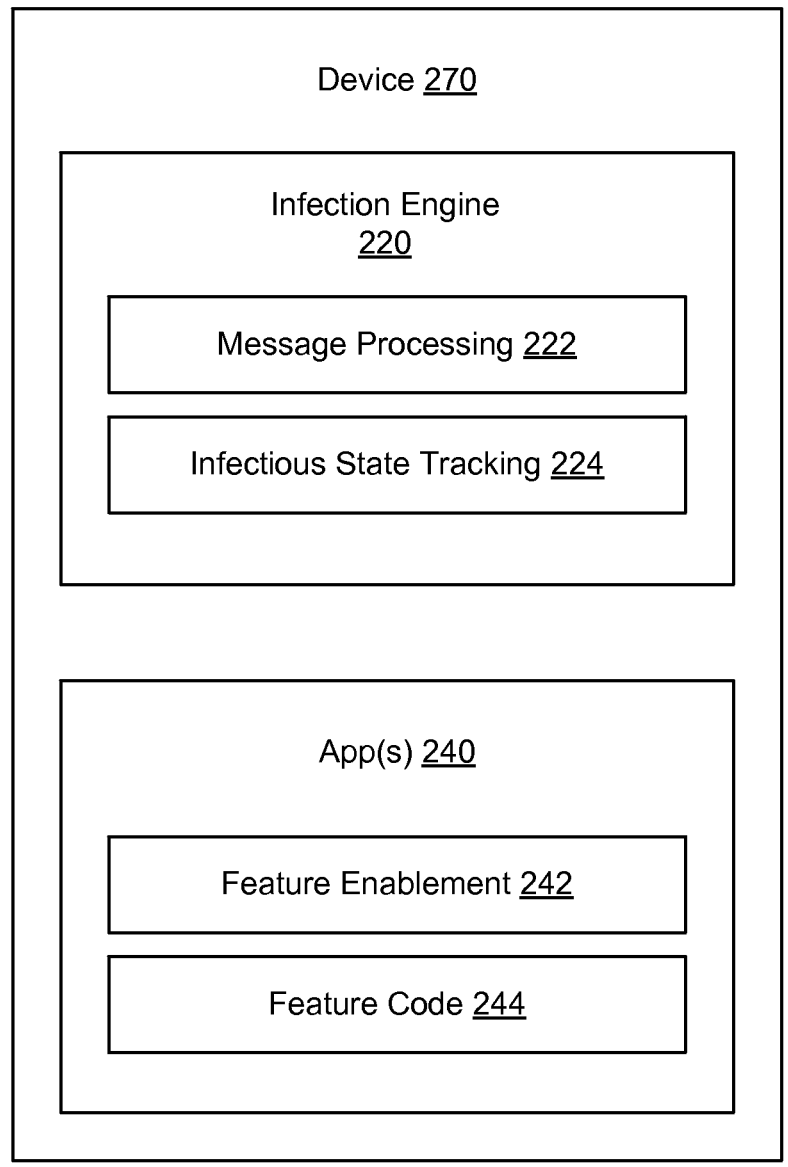
FIG. 2 is a high-level block diagram of the device running an infection engine and at least one app.

FIG. 2 is a high-level block diagram of the device 270 running an infection engine 220 and at least one app 240. The device 270 illustrated is a susceptible device that includes an apt 240 with feature code 244 and a mechanism for feature enablement 242. A patient-zero infectious device can be somewhat simpler, because it may not include an app 240. In FIG. 2, a mobile computing device 270 runs many components, most of which are not illustrated. Infection engine 220 running on the device 270 includes components that handled message processing 222 and infectious state tracking 224. The message handling 222 processes messages pursuant to connections with other devices. These messages may include an enablement token or other infectious message. A susceptible device can receive an infection via the message processing component 222. When an infection takes place, the infectious state tracking 224 transformed the device from the susceptible device into an infectious device. The message processing 222 also conveys at least part of the message to feature enablement 242 of the app 240.

The app 240 begins with feature code 244 which is not enabled or is hidden. In some implementations, the user may have hidden feature code 244 without knowing what the code is capable of doing. At a convention, a user might hear from the speaker about new features that are available by enabling hidden code. Either as part of an app 240 or as a component that interacts with multiple apps 240, feature enablement 242 processes incoming messages to selectively enable feature code 244.

Infection Vectors

Figure 3:
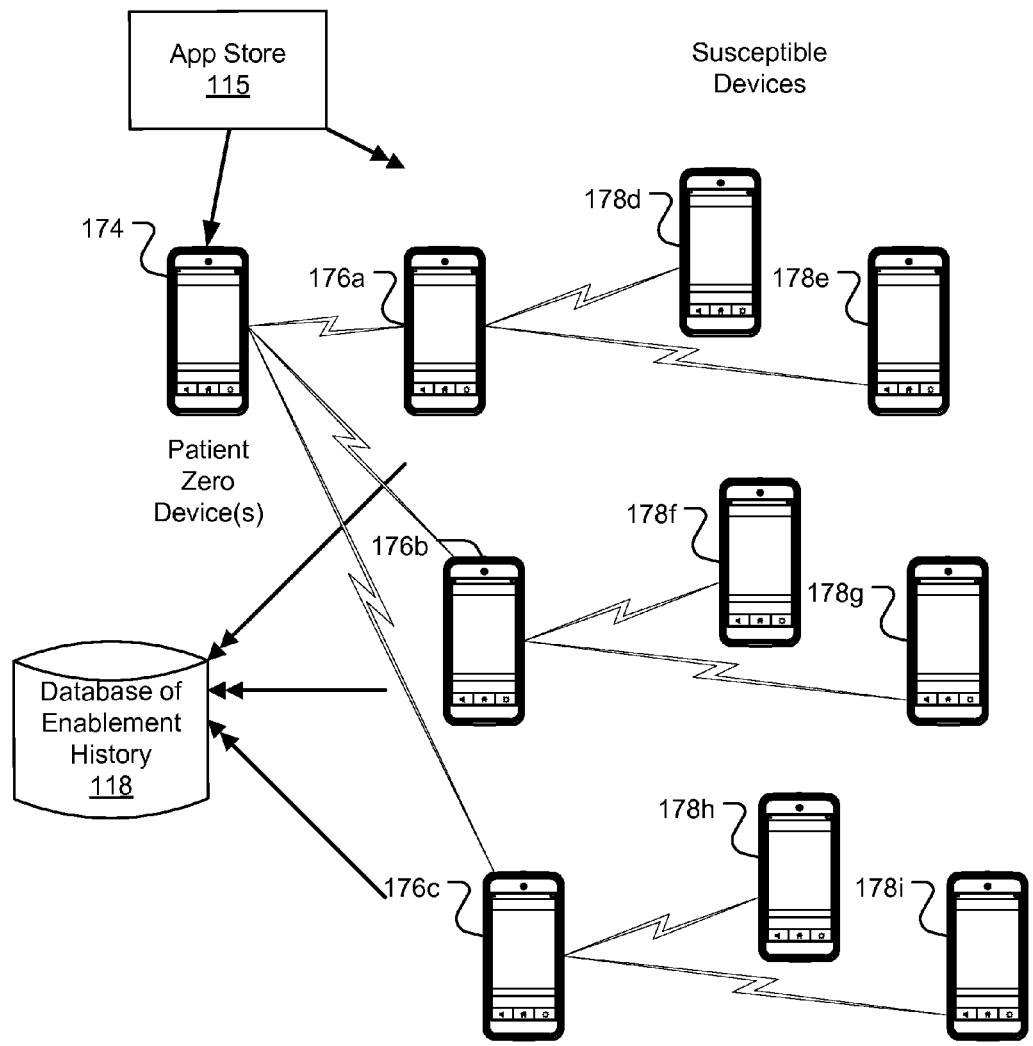
FIGS. 3-4 depict different communication schemes by which proximate interaction can propagate feature enablement from a patient zero device through first devices onto second devices.
Figure 4:
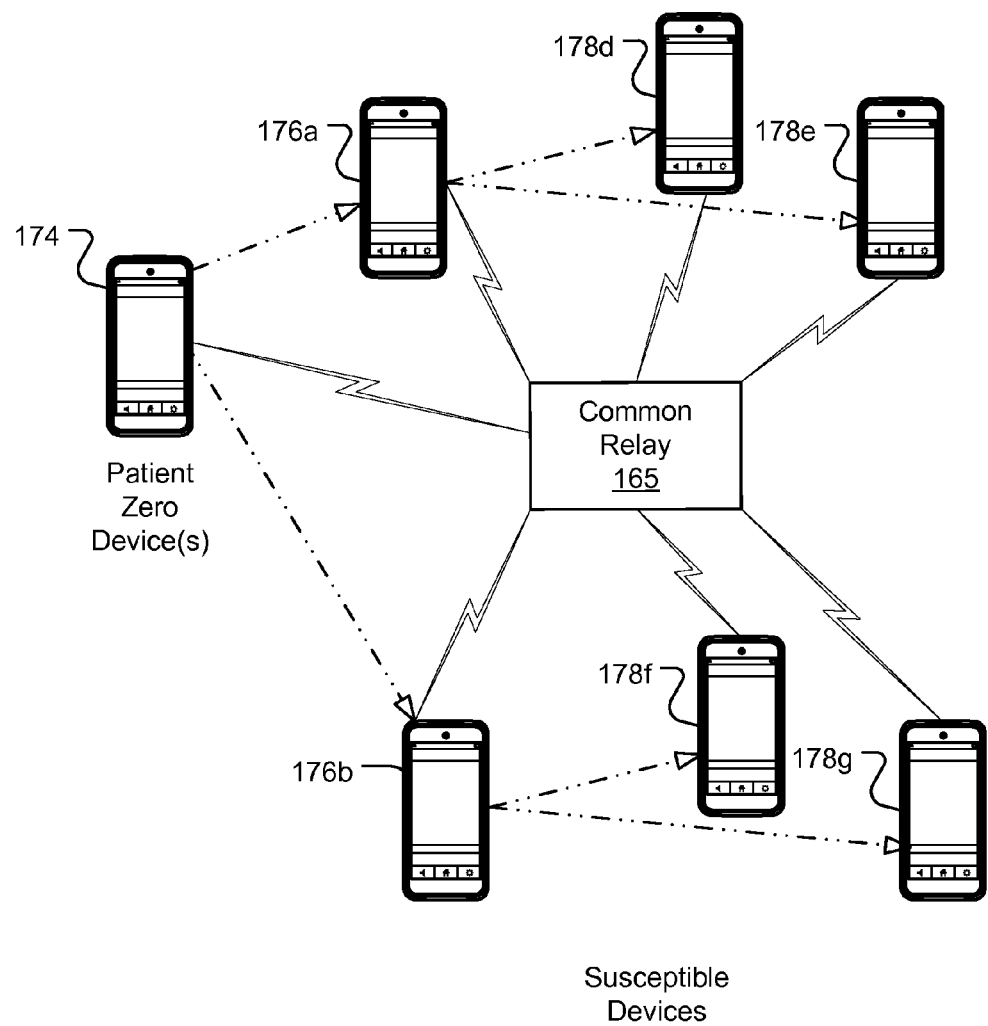

FIGS. 3-4 depict different communication schemes by which proximate interaction can propagate feature enablement from a patient zero device 174 through first devices 176a, 176b, 176c onto second devices 178d-178i. In FIG. 3, the client-side software is distributed by the App Store 115 to multiple devices 174, 176, 178. Different versions of the software may be distributed to patient zero devices 174, as opposed to susceptible devices 176, 178. It is possible for patient zero devices 174 to be infectious without actually having a particular feature enabled. It is expected that first and second devices 176, 178 will have a desired feature that is enabled when they become infected. FIG. 3 illustrates direct communications between devices with lightning bolts. This means some kind of wireless connection. Most wireless connection involves radio waves. Other forms of electromagnetic radiation, such as light, can be used, either for infrared communications, as used by remote control units, or 1D or 2D scan codes, such as used by TSA at airports for paperless boarding passes.

FIG. 4 depicts a second communication scheme in which devices share a common relay 165. Sharing a common relay allows use of alternative communication modes such as Wi-Fi, while maintaining proximate interaction. Connection to a common relay 165 may define sufficient proximity or may be combined with additional criteria, such as matching colors, figures or codes being displayed on infectious and susceptible devices. One example of requiring a match between colors and patterns displayed on two mobile devices is the SLIP™ application produced by YODEL CODE™. See www.yodelcode.com/slip as of Apr. 17, 2014. Another criteria that could be used is detection of a received signal strength above a certain threshold on a second radio used by the mobile devices, separate from Wi-Fi. Another criteria that can be used is detected location. The location can be resolved by GPS location, Wi-Fi location, such as using SKYHOOK™, or any other location resolution method. It may be required that devices be within a certain distance. A further criteria that can be used is bumping two devices together, combining timing of accelerometer readings with another indication of proximity.

While the connection between devices in FIG. 4 is less direct than in FIG. 3, the infection vector, indicated by a dashed line and open headed arrow remains the same as the direct connection infection vector indicated by lightning bolts.

Release of features may be enabled through a social activation technique facilitated by administrators of the system. Specific features may be tied to specific types of peer-to-peer transactions, in one implementation. In another implementation, a feature may only be activated if a pre-defined rule is satisfied, such as completing five peer-to-peer transactions (e.g., a bump between two mobile devices). In other implementation, peer-to-peer feature enablement may be used as part of a gamification of an application's usage such that points may be earned based on peer-to-peer transactions.

User Control

Figure 5:
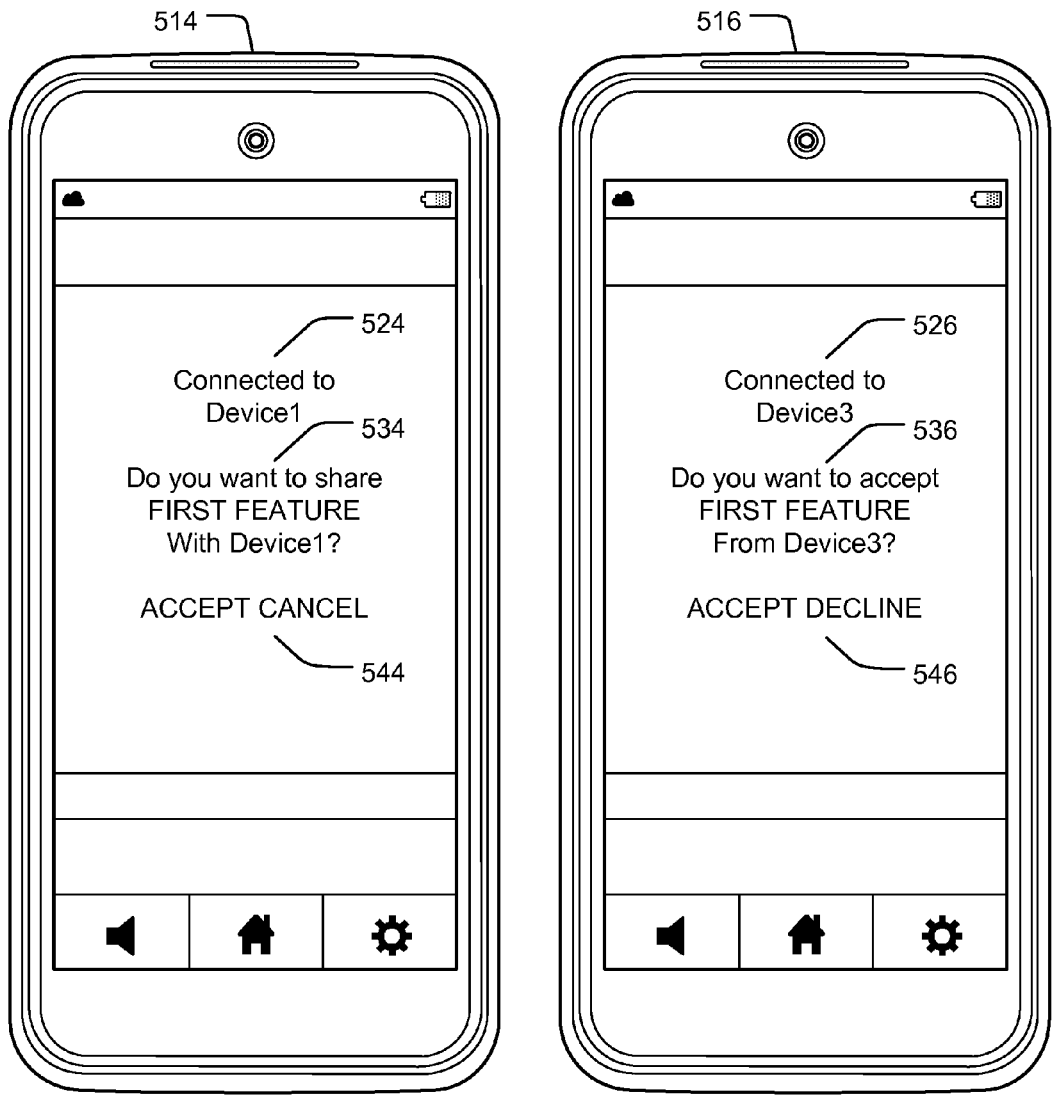
FIG. 5 illustrates infectious and susceptible device interfaces that can be used to confirm sending and receiving a first feature enablement.

FIG. 5 illustrates infectious and susceptible device 514, 516 interfaces that can be used to confirm sending and receiving a first feature enablement. One or both of these interfaces can be made available to allow users control of enablement. These are conceptual interfaces that may be enhanced by colors, patterns, pictures, codes or other identifiers for two users to match. The infectious device 514 in this example indicates the device to which enablement is being transferred 524, the feature being enabled 534, and asks the user to accept or cancel the transfer 544. In other enablement modes, the infectious device enable features on any other device that is willing, any other device that can match the color, pattern, picture or code displayed on device 514, or any other device within a threshold distance. As a proximate interaction distance, the threshold can be on the order of zero feet (as in a bump) to 30 feet (probably within view.) Threshold distances of 0-6 feet, 0-10 feet, or 0-15 feet all are supported by ranges of personal interaction in various settings.

The susceptible device 516 in FIG. 5 indicates the device from which enablement is being received 526, the feature being enabled 536, and asks the user to accept or decline the enablement 546.

Not illustrated, the client side software of an infectious device can be further capable of allowing the user to remedy an infectious state if they do not like the feature that they enabled. That is, they can reverse their infectious state so that their device will not pass on enablement of the feature. This decision can be tracked by the analytical engine.

Flowchart of Events Leading to Infectious Enablement of Features

Figure 6:
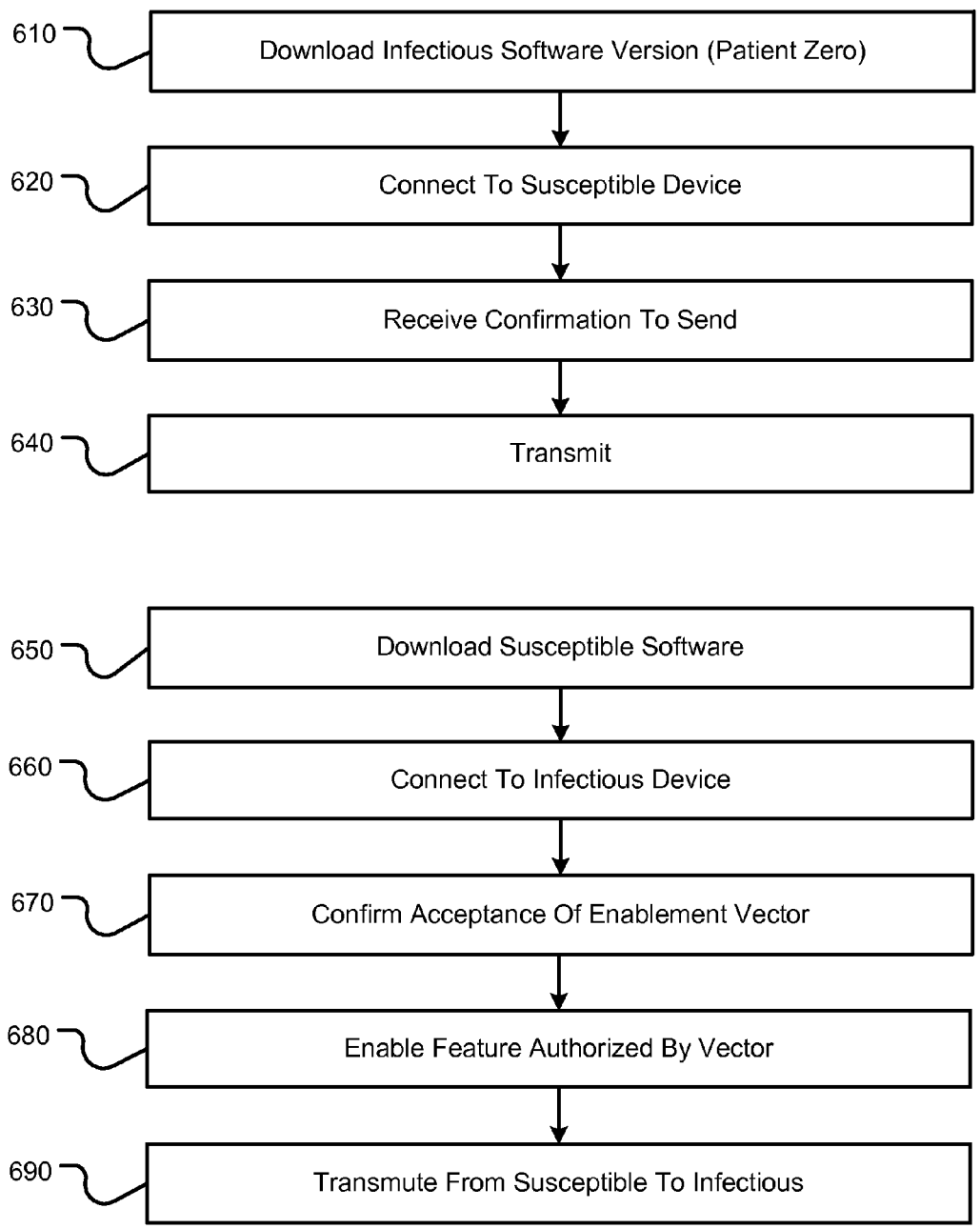
FIG. 6 is a flowchart of one implementation on the infectious device and susceptible device sides of a transmission vector.

FIG. 6 is a flowchart of one implementation on the infectious device and susceptible device sides of a transmission vector. The steps in the flowchart can be viewed or described from the perspective of a server, infectious device, or susceptible device. Not all of the steps need to be practiced to take advantage of the technology disclosed. While the steps are described with respect to a system and hardware such as depicted in FIG. 1, the methods illustrated in the flow charts do not depend on any particular hardware. Similar methods that leverage the technology disclosed may combine steps that are separate in the flowcharts, add supplemental steps, or subdivide the steps illustrated.

The infectious device portion of the flowchart is steps 610-640. At step 610, an infectious version of client-side software is downloaded onto a patient zero device. An app store 115 or other installation server or system can select among apps to distribute 114 and cause the infectious version of the software to be provided to the device.

At step 620, the infectious device connects to a susceptible device. This may happen automatically or may require a connection protocol enforced by the operating system or the infection engine 220. For instance, Bluetooth LE can establish a connection without requiring confirmation by either device user. In contrast, traditional Bluetooth usually is implemented with at least one side of the connection selecting a connection to establish. Traditional Bluetooth sometimes is implemented using confirmation of matching between the systems or entry of a code on one or both sides of the connection.

At step 630, the infection engine on the infectious device can receive a signal from a user of the device or from a user of the susceptible device that confirms sending the feature enablement token or other message to cause feature enablement on the receiving device and to change the receiving device from susceptible to infectious.

At step 640, the infectious device actually transmits the feature enablement token or other message to cause feature enablement.

The susceptible device portion of the flowchart is steps 650-690. At step 650, a susceptible version of client-side software is downloaded onto a susceptible device. This susceptible device can have at least one disabled or hidden feature. An app store 115 or other installation server or system can select among apps to distribute 114 and cause the susceptible version of the software to be provided to the device.

At step 660, the susceptible device connects to an infectious device. This may happen automatically or may require a connection protocol enforced by the operating system or the infection engine 220.

At step 670, the infection engine on the susceptible device can receive a signal from a user of the device that confirms acceptance of the feature enablement token or other message to cause feature enablement on the receiving device. Acceptance can automatically change the receiving device from susceptible to infectious. In some implementations, the receiving user could have been given separate control over enabling the feature and over becoming infectious.

At step 680, the susceptible device receives and implements the feature enablement token or other message to cause feature enablement. The app 240 invokes feature enablement 242 to enable feature code 244. As indicated above, in some implementations, feature enablement may require an additional step of downloading the feature code using the enablement token or other message as authorization.

At step 690, the receiving device changes from susceptible to infectious. The Infection engine 220 invokes infectious state tracking 224 to for this change.

Computer System

FIG. 7 is a block diagram of an example computer system 700 used by an infectious or susceptible device. FIG. 7 is a block diagram of an example computer system, according to one implementation. Computer system 710 typically includes at least one processor 772 that communicates with a number of peripheral devices via bus subsystem 750. These peripheral devices can include a storage subsystem 726 including, for example, memory devices and a file storage subsystem, user interface input devices 738, user interface output devices 778, and a network interface subsystem 776. The input and output devices allow user interaction with computer system 710. Network interface subsystem 776 provides an interface to outside networks, including an interface to corresponding interface devices in other computer systems.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 710.

User interface output devices 778 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 710 to the user or to another machine or computer system.

Storage subsystem 726 stores programming and data constructs that provide the functionality of some or all of the modules and methods described herein. These software modules are generally executed by processor 772 alone or in combination with other processors.

Memory 722 used in the storage subsystem can include a number of memories including a main random access memory (RAM) 734 for storage of instructions and data during program execution and a read only memory (ROM) 732 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 726, or in other machines accessible by the processor.

Bus subsystem 750 provides a mechanism for letting the various components and subsystems of computer system 710 communicate with each other as intended. Although bus subsystem 750 is shown schematically as a single bus, alternative implementations of the bus subsystem can use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as one example. Many other configurations of computer system 710 are possible having more or fewer components than the computer system depicted in FIG. 7.

Particular Implementations

In one implementation, a method is described from the perspective of one or more servers distributing client-side software with features that are not enabled or are hidden. The method includes making enablement of software features contingent on social interaction. This includes delivering for installation to first and second devices susceptible client-side code with at least a first feature in a disabled or hidden state and delivering for installation to third devices infectious client-side code. The first feature can be either enabled or not enabled in the infectious client-side code. Practicing this method, the client-side code makes proximate interaction of a first susceptible device running the susceptible client-side code with a third device running the infectious client-side code capable of enabling the first feature on the first device and of making the first device infectious to other second devices running the susceptible client-side code that have not yet interacted with a device running the infectious client-side code.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified as implementations in this section can readily be combined with sets of base features.

In some implementations, the method is enhanced by receiving activation spread messages as the enabled state of the first feature spreads by proximate interaction between susceptible devices and infectious devices; and repeatedly reporting at least a count of infected devices as the enabled state of the first feature spreads.

In some implementations, the method is enhanced by receiving activation spread locations and times; correlating the locations and times with real world events; and repeatedly reporting at least a pattern of the spread.

In some implementations, the method is enhanced by two or more features in the susceptible client-side code; and requiring different infection vectors to activate respective features.

In some implementations, the method is enhanced wherein the proximate interaction further including the infectious client-side code sending an enablement token to the susceptible client-side code.

In some implementations, the method is enhanced by including the susceptible client-side code requiring consent by a user of a first or second device to the proximate interaction with an infectious device before the first or second device enables the feature and becomes infectious.

In some implementations, the method is enhanced wherein the client-side code on the first and second devices are mobile devices is capable of invoking direct device-to-device communications between the susceptible and infectious devices without relay.

In some implementations, the method is enhanced wherein the direct device-to-device communications uses a Bluetooth protocol.

In some implementations, the method is enhanced wherein the direct device-to-device communications uses near field communications.

In some implementations, the method is enhanced wherein the direct device-to-device communications uses a 1D or 2D bar code.

In some implementations, the method is enhanced wherein the first and second devices are mobile devices and the proximate interaction includes bumping together a respective pair of infectious and susceptible devices.

In some implementations, the method is enhanced wherein the first and second devices are mobile devices and the proximate interaction includes relayed communication through a single access point coupled wirelessly directly to a respective pair of infectious and susceptible devices.

In some implementations, the method is enhanced wherein the client-side code on at least one of devices is capable of calculating an approximate distance between the respective pair of infectious and susceptible devices and requiring the distance to be less than a predetermined threshold for a proximate interaction to take place.

Another implementation describes a system that makes hardware capable of carrying out any of the methods described. The system includes client-side code deployed to first, second and third devices, wherein the client-side code makes the first, second and third devices capable of interactions including wherein the client-side code on the first devices and second devices is susceptible client-side code with at least a first feature in a disabled or hidden state; wherein the client-side code on the third devices is infectious client-side code; proximate interaction of a first susceptible device running the susceptible client-side code with a third device running the infectious client-side code enables the first feature on the first device; and makes the first device infectious to other second devices running the susceptible client-side code that have not yet interacted with a device running the infectious client-side code.

This system and other implementations of the technology disclosed can include one or more of the following features and/or features described in connection with methods disclosed above and in the claims.

In some implementations, the system is enhanced by including an analytic server capable of processing including receiving activation spread messages from the first and second devices receiving activation spread messages as the enabled state of the first feature spreads by proximate interaction between susceptible devices and infectious devices repeatedly reporting at least a count of infected devices as the enabled state of the first feature spreads.

In some implementations, the system is enhanced by the analytic server capable of processing further including receiving activation spread locations and times; correlating the locations and times with real world events; and repeatedly reporting at least a pattern of the spread.

In some implementations, the system is enhanced by two or more features in the susceptible client-side code; and the susceptible client-side code requiring different infection vectors to activate respective features.

In some implementations, the system is enhanced by further including the susceptible client-side code requiring consent by a user of a first or second device to the proximate interaction with an infectious device before the first or second device enables the feature and becomes infectious.

In some implementations, the system is enhanced wherein the client-side code is capable of invoking direct device-to-device communications between the susceptible and infectious devices without relay.

In some implementations, the system is enhanced wherein the first and second devices are mobile devices and the proximate interaction includes relayed communication through a single access point coupled wirelessly directly to a respective pair of infectious and susceptible devices.

Other implementations may include a non-transitory computer readable storage medium storing instructions executable by a processor to perform any of the methods described above or that, when combined with suitable hardware, produce any of the devices described.

The methods, systems and computer readable media described can also be framed from the perspective of an infectious or susceptible device, as explained in the context of FIG. 6.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A non-transitory computer readable storage medium impressed with computer program instructions to enable bonus features of a client-side code by proximate social interaction among first, second and third devices running client-side code, the instructions, when executed on a processor performs a method on the first device comprising:
   installing, by a first client, a client-side code, wherein the client-side code includes a locked desirable bonus feature;
   determining that the client-side code on the first client is in a susceptible state, wherein the susceptible state enables a client to receive an infection from another client-side code on a second client operating in an infectious state through proximate interaction between the first and second clients;
   receiving, from the second client, the infection based on the first client being in the susceptible state;
   based on the infection, transitioning the client-side code from the susceptible state to the infectious state and unlocking the desirable bonus feature in the first client, wherein the infectious state enables the first client to transmit the infection to other clients operating in the susceptible state through proximate interaction; and
   determining that a third client is in proximity to the first client, and transmitting the infection from a first client device to a third client device through proximate interaction to enable the desirable bonus feature on the third client and transition the third client to the infectious state.

2. The non-transitory computer readable storage medium of claim 1, wherein presence of the desirable bonus feature is desired by users of the first devices.

3. The non-transitory computer readable storage medium of claim 1, further configured to cause the processor to:
   receive activation spread messages as the transition from the susceptible state to the infectious state spreads; and
   report the transition, contributing to a count of infected devices as the unlocking of the desirable bonus feature spreads.

4. The non-transitory computer readable storage medium of claim 3, further configured to cause the processor to:
   receive activation spread locations and times;
   correlate the locations and times with real world events; and
   repeatedly report at least a pattern of the spread.

5. The non-transitory computer readable storage medium of claim 1, further configured:
   with two or more desirable bonus features that become available after being unlocked; and
   requiring different infection vectors to unlock respective desirable bonus features.

6. The non-transitory computer readable storage medium of claim 1, wherein the client-side code in the susceptible state requires consent by a user of the first devices to the proximate interaction with an infectious device before the first device unlocks the desirable bonus feature and becomes infectious.

7. The non-transitory computer readable storage medium of claim 1, wherein the client-side code on the first devices, the second devices and the third devices invokes direct device-to-device communications between susceptible and infectious devices without relay.

8. The non-transitory computer readable storage medium of claim 1, wherein the proximate interaction includes relayed communication through a single access point coupled wirelessly directly to a respective pair of infectious and susceptible devices.

9. The non-transitory computer readable storage medium of claim 8, further configured to cause the processor executing the client-side code on at least one of the first devices, the second devices and the third devices to calculate an approximate distance between a respective pair of infectious and susceptible devices and requires the approximate distance to be less than a predetermined threshold for a proximate interaction to take place.

10. A method of enabling desirable bonus features of a client-side code by proximate social interaction among first, second, and third devices, the method including:
   installing, by a first client, the client-side code, wherein the client-side code includes a locked desirable bonus feature;

determining that the client-side code on the first client is in a susceptible state, wherein the susceptible state enables a client to receive an infection from another client-side code on a second client operating in an infectious state through proximate interaction between the first and second clients;

receiving, from the second client, the infection based on the first client being in the susceptible state;

based on the infection, transitioning the client-side code from the susceptible state to the infectious state and unlocking the desirable bonus feature in the first client, wherein the infectious state enables the first client to transmit the infection to other clients operating in the susceptible state through proximate interaction; and determining that a third client is in proximity to the first client, and transmitting the infection from a first client device to a third client device through proximate interaction to enable the desirable bonus feature on the third client and transition the third client to the infectious state.

11. The method of claim 10, wherein presence of the desirable bonus feature is desired by users of the first devices.

12. The method of claim 10, further including:
receiving activation spread messages as the transition from the susceptible state to the infectious state spreads; and
reporting the transition, thereby contributing to a count of infected devices as the unlocking of the desirable bonus feature spreads.

13. The method of claim 10, wherein transitioning from a susceptible state to an infectious state further includes unlocking two or more desirable bonus features.

14. The method of claim 10, wherein the client-side code in the susceptible state requires consent by a user of the first devices to the proximate interaction with an infectious device before the first device unlocks the desirable bonus feature and becomes infectious.

15. The method of claim 10, wherein the client-side code on the first devices, the second devices and the third devices invokes direct device-to-device communications between susceptible and infectious devices without relay.

16. The method of claim 10, wherein the proximate interaction includes relayed communication through a single access point coupled wirelessly directly to a respective pair of infectious and susceptible devices.

17. The method of claim 16, further including the client-side code on at least one of the first devices, the second devices and the third devices calculates an approximate distance between a respective pair of infectious and susceptible devices and requires the approximate distance to be less than a predetermined threshold for a proximate interaction to take place.

18. A non-transitory computer readable storage medium impressed with computer program instructions, the instructions, when executed on a processor, implement the method of claim 10.

19. A system including one or more processors coupled to memory, the memory loaded with computer instructions, the instructions, when executed on the processors, implement actions of claim 10.

20. A method of enabling desirable bonus features of a client-side code by proximate social interaction with first and second devices, the method including:
receiving, from a second client that is operating in an infectious state, a desirable bonus feature unlocking message at a first client that is in a susceptible state, wherein the desirable bonus feature unlocking message authorizes the first client to unlock a desirable bonus feature and to transition from the susceptible state to the infectious state;

wherein a client-side code on the first client is in the susceptible state and includes a locked instance of the desirable bonus feature when the desirable bonus feature unlocking message is received, wherein the susceptible state enables the first client to receive an infection from the second client through proximate interaction between the first and second clients; and based on the infection, transitioning the client-side code from the susceptible state to the infectious state and unlocking a desirable bonus feature in the first client, wherein the infectious state enables the first client to transmit the infection to other clients operating in the susceptible state through proximate interaction and authorize the other clients in the susceptible state to unlock the desirable bonus feature on the other clients.

21. The method of claim 20, wherein presence of the desirable bonus feature is desired by users of the first devices.

22. The method of claim 20, wherein transitioning from a susceptible state to an infectious state further includes unlocking two or more desirable bonus features.

23. The method of claim 20, wherein the client-side code on the first devices, the second devices and the third devices invokes direct device-to-device communications between susceptible and infectious devices without relay.

24. A non-transitory computer readable storage medium impressed with computer program instructions, the instructions, when executed on a processor, implement the method of claim 20.

25. A system including one or more processors coupled to memory, the memory loaded with computer instructions, the instructions, when executed on the processors, implement actions of claim 20.

* * * * *